United States Patent
Al-Mayahi et al.

(10) Patent No.: US 8,099,958 B2
(45) Date of Patent: Jan. 24, 2012

(54) OSMOTIC ENERGY

(75) Inventors: Abdulsalam Al-Mayahi, Surrey (GB); Adel Sharif, Guildford (GB)

(73) Assignee: Surrey Aquatechnology Limited, Surrey (GB)

( * ) Notice: Subject to any disclaimer, the term of this patent is extended or adjusted under 35 U.S.C. 154(b) by 348 days.

(21) Appl. No.: 12/285,046

(22) Filed: Sep. 29, 2008

(65) Prior Publication Data

US 2009/0091139 A1    Apr. 9, 2009

Related U.S. Application Data

(63) Continuation of application No. 10/568,082, filed on Feb. 13, 2006, now abandoned.

(30) Foreign Application Priority Data

Aug. 13, 2003   (GB) .................................. 0319042.8

(51) Int. Cl.
*F01K 25/06* (2006.01)
(52) U.S. Cl. ............................ 60/649; 60/651; 60/671
(58) Field of Classification Search .............. 60/649, 60/651, 655, 671
See application file for complete search history.

(56) References Cited

U.S. PATENT DOCUMENTS

| | | | |
|---|---|---|---|
| 3,587,227 A | 6/1971 | Weingarten | |
| 3,825,122 A | 7/1974 | Taylor | |
| 3,906,250 A | 9/1975 | Loeb | |
| 3,978,344 A | 8/1976 | Jellinek | |
| 4,177,146 A | 12/1979 | Popper et al. | |
| 4,193,267 A | 3/1980 | Loeb | |
| 5,238,574 A | 8/1993 | Kawashima et al. | |
| 6,185,940 B1 | 2/2001 | Prueitt | |
| 6,539,718 B2 * | 4/2003 | Bronicki et al. | ............ 60/641.2 |
| 6,540,487 B2 | 4/2003 | Polizos et al. | |

FOREIGN PATENT DOCUMENTS

GB   3121968   5/1983

OTHER PUBLICATIONS

English Abstract of DE 3121968.

* cited by examiner

*Primary Examiner* — Hoang Nguyen
(74) *Attorney, Agent, or Firm* — Whyte Hirschboeck Dudek SC (57) ABSTRACT

A process for driving a prime mover, said process comprising a) positioning a selective membrane between a liquid and a solution having a higher osmotic potential than the liquid, such that the solution becomes pressurized by the influx of liquid across the membrane, b) using the pressure generated in the solution to drive a prime mover, c) recovering the solution, d) separating at least some of the solvent from the solution to form a residual product, and e) recycling the separated solvent and/or the residual product of step d) to step a).

21 Claims, 4 Drawing Sheets

OSMOTIC ENERGY

The present invention relates to a process for driving a prime mover. The present invention also relates to an apparatus for driving a prime mover, for example, for generating hydraulic power.

When a dilute aqueous solution (low osmotic potential, low entropy) is separated from a concentrated aqueous solution (high osmotic potential, high entropy) by a semi-permeable membrane, water from the dilute aqueous solution will flow across the semi-permeable membrane to dilute the concentrated aqueous solution. The phenomenon is known as osmosis.

U.S. Pat. No. 3,978,344 describes a process in which osmotic energy is converted into other forms of energy. Specifically, this reference describes a process in which a semi-permeable membrane is used to separate a body of freshwater from a body of seawater. The difference in osmotic potential between the freshwater and the seawater causes water to pass through the membrane into the seawater, resulting in an increase in hydrostatic pressure on the seawater side of the membrane. The seawater may be ejected as a pressurised stream, which may be used to rotate a turbine coupled to an electrical generator.

The passage of freshwater through the semi-permeable membrane results in dilution of the seawater, which eventually limits the production of energy from a given body of seawater. Thus, the diluted seawater must be replenished periodically or continuously with a fresh seawater.

According to the present invention, there is provided a process for driving a prime mover, said process comprising
  a) positioning a selective membrane between a liquid and a solution having a higher osmotic potential, than the liquid, such that the solution becomes pressurised by the influx of liquid across the membrane,
  b) using the pressure generated in the solution to drive a prime mover,
  c) recovering the solution,
  d) separating at least some of the solvent from the solution to form a residual product, and
  e) recycling the separated solvent and/or the residual product of step d) to step a).

In one embodiment, the residual product of step d) is recycled to the solution of step a). Alternatively or additionally, the separated solvent may be recycled to the liquid side of the membrane in step a).

The influx of liquid across the selective membrane generates pressure (e.g. hydrostatic pressure) the solution. The pressurised solution from step a) may be used directly to drive the prime mover. Alternatively, the solution from step a) may be recovered and some of the solvent of the recovered solution may be removed. The resulting concentrated solution may be used to drive the prime mover before being recycled to step a). Alternatively or additionally, the solvent separated from the solution may be used to drive the prime mover. In all instances, at least some of the pressure generated in the solution in step a) is used to drive the prime mover. Optionally, the generated pressure in the solution may be used to pump the solution for subsequent processing.

Any suitable selective membrane may be used in step a). The membrane may have an average pore size of 1 to 60 Angstroms, preferably, 2 to 50 Angstroms, more preferably, 5 to 40 Angstroms, for example, 10 to 30 Angstroms. In one embodiment, the membrane has an average pore size of 12 to 25 Angstroms.

The average pore size of the membrane is preferably smaller than the size of the solutes in the solution. Advantageously, this prevents or reduces the flow of solute across membrane by diffusion, allowing liquid to flow across the membrane along the osmotic (entropy) gradient. The flux of liquid across the membrane is influenced by the pore size of the membrane. Generally, the larger the pore size, the greater the flux.

Suitable selective membranes include integral membranes and composite membranes. Specific examples of suitable membranes include membranes formed of cellulose acetate (CA) and membranes formed of polyamide (PA). Preferably, the membrane is an ion-selective membrane. Conventional semi-permeable membranes may also be employed.

The membrane may be planar or take the form of a tube or hollow fibre. If desired, the membrane may be supported on a supporting structure, such as a mesh support. The membrane may be corrugated or of a tortuous configuration.

The prime mover may be any suitable device, which is suitable for converting energy in the solution into mechanical power. Suitable prime movers include rotary prime movers, such as turbines. Thus, the prime mover may be used to generate power.

Alternatively, the prime mover may be or form part of a pressure exchange system. Thus, the prime mover may also be used to transfer energy from the pressurised solution to another fluid. Examples of suitable pressure exchange systems are described in U.S. Pat. No. 4,887,942, U.S. Pat. No. 5,338,158, U.S. Pat. No. 5,988,993 and U.S. Pat. No. 6,540,487. The pressure exchange system may comprise a housing having a body portion with end elements at opposite ends of the body portion. A rotor may be positioned in the body portion in substantially sealing contact with the end plates. The rotor may be provided with at least one channel extending longitudinal from one end of the rotor to the opposite end of the rotor with an opening at each end. In use, the channel(s) provide alternate hydraulic communication between a high pressure liquid, such as the pressurised solution from step a), and a low pressure liquid to transfer pressure between the liquids.

In the process of the present invention, a selective membrane is positioned between a liquid and a solution. The solution has a higher osmotic potential than the liquid. Thus, the total dissolved salt (TDS) concentration of the solution is typically higher than that of the liquid.

The difference in osmotic potential between the liquid and the solution causes solvent to pass across the selective membrane from the side of low osmotic potential (i.e. low solute concentration or low entropy or high solvent concentration) to the side of high osmotic potential (i.e. high solute concentration or high entropy or low solvent concentration). This influx of liquid leads to an increase in pressure in the solution. For example, the pressure of the solution may be increased from $10^5$ to $10^7$ Pa to a pressure of $1.1 \times 10^5$ to $5.0 \times 10^7$ Pa due to the influx of liquid. In a preferred embodiment, the pressure of the solution may be increased from $10^5$ to $10^7$ Pa to a pressure of $1.5 \times 10^5$ to $2.5 \times 10^7$ Pa due to the influx of liquid.

Step a) of the process of the present invention may be carried out in a housing. The housing is preferably provided with an inlet for introducing the liquid to one side of the selective membrane and an outlet for removing pressurised solution from the opposite side of the membrane. In a preferred embodiment, the influx of liquid into the solution is sufficient to eject the solution from the housing at a pressure of $1.1 \times 10^5$ to $5.0 \times 10^7$ Pa, preferably, $1.5 \times 10^5$ to $2.5 \times 10^7$ Pa. The outlet of the housing may be sized to ensure that the solution is ejected at appropriate pressures. Additionally or alternatively, a nozzle (a pressure regulator) may be coupled to the outlet to adjust the pressure of the solution accordingly.

The pressurised solution may be removed from the housing, for example, as a pressurised stream. The pressure generated in the solution may be used to drive a prime mover. The solution may be introduced directly to the prime mover to drive the prime mover, for example, to generate power. Alternatively, the pressure generated in the solution may be transferred to another liquid via a pressure exchange system. The pressurised solution from step a) may be used directly in step b) to drive the prime mover. Alternatively, it may be possible to carry out steps c) and d) of the process prior to step b).

The pressure generated in the solution may be sufficient to eject the solution from the housing to an elevated height of, for example, 10 to 2500 m, preferably, 50 to 1500 m. Thus, the solution may be introduced to the prime mover from an elevated height. In this way, at least part of the potential energy of the solution is converted into mechanical energy. The mechanical energy of the prime mover may be subsequently converted into other forms of energy, such as electricity and/or heat. In certain embodiments, it may be desirable to store the solution at an elevated location, prior to introducing the solution to the prime mover.

In step c), the solution is recovered. Solvent is then removed from the recovered solution (step d). This solvent removal step may be carried out by any suitable solvent removal/separation method. Thermal and/or membrane separation steps may be employed. A combination of one or more thermal separation steps and/or one or more membrane separation steps may be employed.

Examples of suitable thermal separation techniques include evaporation, distillation and crystallization. Evaporation may be carried out naturally, for example, by allowing the solvent to evaporate in air under ambient conditions. Alternatively, evaporation may be carried out in a cooling tower. Suitable distillation methods include multi-stage flash distillation (MSF), multi-effect distillation (MED) mechanical vapour compression (MVC) and rapid spray desalination.

In multi-stage flash distillation, the solution is introduced into a series of tubes and heated to an elevated temperature. The heated solution is then introduced into an evaporation chamber and subjected to a pressure below its vapour pressure. The sudden reduction in pressure causes boiling or flashing to occur. The flashed vapours are separated from the salty residue by condensation on the tubes of the incoming solution streams. A series of evaporation chambers is typically employed. Thus, the evaporation or flashing step occurs in multiple stages.

Multiple effect distillation takes place in a series of effects and uses the principle of reducing the ambient pressure in the various effects. This permits the solution to boil in a series of stages without the need for additional heat to be supplied after the first effect.

In multiple effect distillation, the solution may be preheated and sprayed onto the surface of evaporator tubes as a thin film of liquid. The tubes are heated by passing a steam through the tubes. On coming into contact with the heated surface of the tubes, the sprayed liquid evaporates. This vapour is used to heat the evaporator tubes of the next effect and the transfer of heat causes the vapour in the tubes to condense. By evaporating and condensing the solution in this manner, the solvent from the solution may be recovered.

The efficiency of the multiple effect distillation step may be increased by compressing the vapour of at least one of the effects. The combination of multiple effect distillation and compression is known as MED-thermo compression.

Mechanical vapour compression (MVD) may also be used to remove solvent from the solution. In mechanical vapour compression, vapour from a vessel is typically extracted and then condensed by compression in a tube located within the vessel. The compression and condensation step generates heat, which heats the walls of the tube. When solution is sprayed onto the surface of the tube, it evaporates generating more vapour. By repeating the extraction, compression and condensation steps, further solvent may be recovered from the solution.

Rapid spray desalination (RSD) may also be used to remove solvent from the solution. In a typical rapid spray desalination process, air is blown across a heating element into an evaporation chamber. As the heated air moves along the evaporation chamber, a nebulized solution of, for example, brine, is injected into the evaporation chamber. The moving vapour and brine droplets pass through a mechanical filter, which traps the brine droplets, allowing the pure vapour phase to pass on towards a condenser. The brine droplets may be periodically flushed from the filter.

As mentioned above, crystallization methods may also be employed to separate solvent from the solution. Crystallization may be affected to crystallize the solvent or solute out of solution.

Crystallization may be carried out by cooling the solution to, for example, the freezing point of the solvent. This causes at least some of the solvent in the solution to crystallize. This crystallized solvent may then be removed. Crystallization may be preferred in cool climates, where the low ambient temperatures may be used to reduce the temperature of the solution to effect crystallization.

Alternatively, a thermal separation column may be employed to affect crystallization. For example, the solution may be cooled in a thermal separation column such that at least some of the dissolved solutes precipitate out of solution. These precipitates may collect at the bottom of the column and recovered, leaving the solution at the top of the column with a reduced solute concentration. Advantageously, the solution may be formed using a salt having a solubility that is sensitive to temperature variations. Preferably, such salts readily precipitate out of solution at low temperatures. Examples of such salts include hydrogenphosphates such as disodium hydrogenphosphate ($Na_2HPO_4.12H_2O$).

In one embodiment, the solution from step a) may be transferred to an elevated height (e.g. top of a mountain) where the ambient temperature is i) low enough to crystallize the solutes species in the solution or ii) below the freezing point of the solution to crystallize the solvent. This causes separation of the solution into two portions. One portion has a low solute concentration, whilst the other portion has a higher solute concentration. Each of these solutions may be returned to ground level so that the potential energy of the solutions may be used to drive the prime mover. These solutions may be recycled to step a).

Suitable membrane methods for separating solvent from the solution include ion-exchange, electro-dialysis, electrodialysis reversal, nanofiltration and reverse osmosis. When membranes are used, they should be able to withstand the high pressures generated in the system.

The thermal energy required to drive the solvent removal step may be provided by a number of sources. For example, the thermal energy may be provided by the surroundings (e.g. evaporation at ambient temperature), geothermal sources and/or solar energy. Evaporation at ambient temperature may be favoured in hot climates. It may also be possible to induce solvent removal by passing air, for example, dry warm air, over the solution, so as to effect evaporation of the solvent. Alternatively or additionally, the excess heat from an industrial process (e.g. a power station, a refinery, chemical plant) may be used to drive the solvent removal step. In other words, the solvent removal step of the present invention may be used to remove excess heat from an industrial process.

In a further embodiment, the thermal energy required to drive the solvent removal step may be provided by the combustion of a fuel, such as oil, wood, peat, bushes, grass, straw, natural gas and coal. Waste products may also be incinerated to provide the thermal energy required for the solvent removal step.

In yet a further embodiment, the thermal energy required to drive the solvent removal step may be provided by biological processes, such as thermogensis and fermentation.

In another embodiment, the thermal energy required to drive the solvent removal step may be provided by the compression and decompression of gas (e.g. air). When a gas expands isotropically at a given temperature, its final temperature at the new pressure is much lower. The resulting cold gas, can be used as a refrigerant, either directly in an open system, or indirectly by means of a heat exchanger in a closed system. Conversely, the compression of gas causes the temperature of the gas to increase. The heat of compression can be used to heat the solution and/or evaporate the solvent.

In yet another embodiment, the thermal energy required to drive the solvent removal step may be provided by wind power. Wind power can be used to compress air and the heat of compression can be used to heat the solution and/or evaporate the solvent. The air may then be decompressed and the cooling effect of the decompression can be used to cool the solution and/or condense the vapour. The use of air as a coolant is based on the principle that, when a gas expands isotropically at a given temperature, its final temperature at the new pressure is much lower. The resulting cold gas, in this case air, can then be used as a refrigerant, either directly in an open system, or indirectly by means of a heat exchanger in a closed system.

The sources of thermal energy discussed above may be particularly useful for removing solvent by evaporation/distillation.

Once solvent is removed from the solution, a residual product is produced. This residual product is preferably recycled to a solution that is suitable for use in step a). For example, the residual product produced in step d) of the process may be recycled to the solution of step a) of that process. Alternatively, when more than one of the processes of the present invention are carried out (e.g. concurrently), it is possible to recycle the residual product of one of the processes to step a) of another of the processes.

The process of the present invention may be carried out continuously, reducing or eliminating the need for replacing or replenishing the solution of step a) with fresh solution. It is also not necessary to add fresh solute to the solution, although this may be desirable in some instances.

The residual product may take the form of a solid product or a concentrated solution. Where the residual product is a solid product, the solid product may be added to the solution of step a) to increase the solute concentration of the solution of step a). This can help to maintain the difference in solute concentration between the two sides of the membrane, and ensure that the flow of liquid across the membrane occurs at a sufficient rate.

Where the residual product is a solid product, the solid product may also be diluted with solvent to produce a concentrated solution. This concentrated solution can be introduced to the solution of step a). By adjusting the concentration of this solution accordingly, the solute concentration of the solution of step a) may be maintained at desired levels. This can help to maintain the difference in solute concentration between the two sides of the membrane, and ensure that the flow of liquid across the membrane occurs at a sufficient rate.

When the residual product is a concentrated solution, the concentrated solution may be introduced to the solution side of the selective membrane of step a). In certain embodiments, it may be necessary to alter the concentration of the concentrated solution prior to use, for example, by adding more solvent or solute to the solution. By adjusting the concentration of the solution accordingly, the solute concentration of the solution may be maintained at desired levels. This can help to maintain the difference in solute concentration between the two sides of the membrane, and ensure that the flow of water across the membrane occurs at a sufficient rate.

The solvent removed in the solvent removal step may be recovered and recycled, for example, to a liquid that is suitable for use in step a). The solvent removed in step d) of the process may be recycled to step a) of the process, or, alternatively, when a plurality of processes of the present invention are carried out (e.g. concurrently), the solvent removed in step d) of one particular process may be recycled to step a) of another process.

Alternatively or additionally, the removed solvent may be discarded or used for other purposes. In one embodiment, the liquid is seawater and the solution is an aqueous solution. Thus, the solvent removed from the solution in step d) is water. This water may be used for a number of applications, including agricultural, industrial and domestic applications (e.g. as drinking water). Thus, in this embodiment of the present invention, the process of the present invention may be used to desalinate seawater.

It may be possible to replenish or to replace the liquid of step a) with fresh liquid, for example, periodically or continuously.

The liquid employed in step a) of the process of the present invention is preferably water or an aqueous solution. For example, the liquid may be seawater, freshwater (e.g. from rivers, lakes and underground sources) and brackish water. Grey water streams, for example, waste washing water (e.g. laundry) and streams from gullies, may also be used. Thus, the liquid may contain impurities that are typically found in water from these sources. For example, the liquid may contain dissolved salts, such as metal or ammonium salts. Examples of salts that may be present include fluorides, chlorides, bromides, iodides, sulphates, sulphites, sulphides, carbonates, hydrogencarbonates, nitrates, nitrites, nitrides, phosphates, aluminates, borates, bromates, carbides, chlorides, perchlorates, hypochlorates, chromates, fluorosilicates, fluorosilicates, fluorosulphates, silicates, cyanides and cyanates. Preferably, salts of alkali and/or alkali earth metals are employed. Examples of such metals include, but are not limited to, lithium, sodium, potassium, magnesium, calcium and strontium. In one embodiment, the liquid is seawater and, therefore, includes sodium chloride in a concentration of at least 3 weight %.

In an alternative embodiment, the liquid may be an effluent from an industrial or agricultural process.

The solute concentration (i.e. TDS) of the liquid may be 0 to 40 weight %, preferably, 0.0 to 6 weight %.

During osmosis, at least some of dissolved solutes and suspended impurities in the liquid will be prevented from flowing across the membrane. Preferably, all dissolved solutes/impurities will remain on the liquid-side of the membrane, allowing the liquid to flow across the membrane to dilute the solution on the other side of the membrane. Thus, where the liquid is a solution of a solute dissolved in a solvent, the solute is preferably prevented from flowing across the membrane, allowing the solvent to flow across the membrane to dilute the solution on the other side. Specifically, where the liquid is an aqueous solution, dissolved solutes and/or suspended impurities in the solution are preferably prevented from flowing across the membrane, allowing water to flow across the membrane to dilute the solution on the other side.

The solution may be formed of an organic and/or inorganic solvent. Suitable organic solvents include hydrocarbons, such as aliphatic and aromatic hydrocarbons. Mixtures of organic solvents may be employed. The hydrocarbons may be straight chain, branched and/or cyclic. Examples include, but are not limited to, alkanes, alkenes and alkynes. The hydrocarbons may be substituted with one or more heteroatoms, for example, fluorine, chlorine, bromine, iodine, oxygen, sulphur, nitrogen, and/or phosphorus atoms. In one embodiment, oxygenated hydrocarbons, such as aldehydes, ketones, carboxylic acids, ethers, esters, alcohols and/or their derivatives may be employed. For example, glycol ethers and glycol ether esters may also be employed. Alternatively or additionally, halogenated solvents, such as chlorinated, brominated and/or fluorinated hydrocarbons may be employed.

Suitable inorganic solvents include acidic solvents, alkaline solvents and/or water. Water is preferably employed as solvent in the solution.

The solution is preferably an aqueous solution.

Suitable solutes for the solution include organic compounds, biological compounds and/or inorganic compounds.

Suitable organic compounds include hydrocarbons, such as aliphatic and aromatic hydrocarbons. Mixtures of two or more organic compounds may be employed. The hydrocarbons may be straight chain, branched and/or cyclic. Examples of suitable hydrocarbons include, but are not limited to, alkanes, alkenes and alkynes. The hydrocarbons may be substituted with one or more heteroatoms, for example, fluorine, chlorine, bromine, iodine, oxygen, sulphur, nitrogen, and/or phosphorus atoms. In one embodiment, oxygenated hydrocarbons, such as aldehydes, ketones, carboxylic acids, ethers, esters, alcohols and/or their derivatives may be employed. The organic solute species may have a molecular weight of from 100 to 10000 $gmol^{-1}$, preferably, 300 to 5000 $gmol^{-1}$, more preferably, 400 to 2000 $gmol^{-1}$ and, even more preferably, 500 to 1000 $gmol^{-1}$.

Suitable biological compounds include proteins, amino acids, nucleic acids, carbohydrates and lipids. Mixtures of two or more biological compounds may be employed. Preferred biological solutes include sugars, such as cane sugar and/or beet sugar. Glucose, fructose and sucrose may also be employed. The biological solute species may have a molecular weight of from 100 to 10000 $gmol^{-1}$, preferably, 300 to 5000 $gmol^{-1}$, more preferably, 400 to 2000 $gmol^{-1}$ and, even more preferably, 500 to 1000 $gmol^{-1}$.

Preferably, the solution is a solution of one or more inorganic compounds, such as inorganic salts. Suitable salts include metal or ammonium salts. Mixtures of two or more salts may be employed. Examples include, but are not limited to, fluorides, chlorides, bromides, iodides, sulphates, sulphites, sulphides, carbonates, hydrogencarbonates, nitrates, nitrites, nitrides, hydrogenphosphates, phosphates, aluminates, borates, bromates, carbides, chlorides, perchlorates, hypochlorates, chromates, fluorosilicates, fluorosilicates, fluorosulphates, silicates, cyanides and cyanates. Preferably, salts of alkali and/or alkali earth metals are employed. Examples of such metals include, but are not limited to, lithium, sodium, potassium, magnesium, calcium and strontium.

Preferably, the solution is an aqueous solution of at least one salt selected from sodium chloride, potassium chloride, potassium nitrate, magnesium sulfate (e.g. $MgSO_4.6H_2O$ or $MgSO_4.7H_2O$), magnesium chloride (e.g. $MgCl_2.6H_2O$), sodium sulfate (e.g. $Na_2SO_4.10H_2O$), calcium chloride (e.g. $CaCl_2.2H_2O$ or $CaCl_2.6H_2O$), sodium carbonate, disodium hydrogenphosphate ($Na_2HPO_4.12H_2O$) and potassium alum ($24H_2O$). In a preferred embodiment, the solution is an aqueous solution of sodium chloride.

Preferably, the solution is formed by introducing a known quantity of a solute into a known quantity of solvent. Preferably, the solution consists essentially of a selected solute dissolved in a selected solvent. For example, in one embodiment, the process of the present invention further comprises the step of dissolving a selected solute in a selected solvent. In one embodiment, the solution is formed by mixing ammonia and carbon dioxide in water. The resulting solution may contain a concentrated solution of ammonia, carbon dioxide, ammonium carbonate, ammonium bicarbonate and ammonium carbamates as described in WO 02/060825.

Alternatively, the solution may be derived from an existing stream such as a waste stream from an industrial process. For example, the solution may be a cooling tower blowdown effluent, seawater, a water desalination effluent or an effluent from an oil extraction process.

In one embodiment, the solution has a solute (e.g. salt) concentration of 1 to 400 weight %, preferably, 2 to 100 weight %, more preferably, 5 to 80 weight %, for example, 10 to 50 weight %. The solute may be one or more of the solutes mentioned above. For example, the solute may be a salt selected from sodium chloride, potassium chloride, potassium nitrate, magnesium sulfate (e.g. $MgSO_4.6H_2O$ or $MgSO_4.7H_2O$), magnesium chloride (e.g. $MgCl_2.6H_2O$), sodium sulfate (e.g. $Na_2SO_4.10H_2O$), calcium chloride (e.g. $CaCl_2.2H_2O$ or $CaCl_2.6H_2O$), sodium carbonate, disodium hydrogenphosphate ($Na_2HPO_4.12H_2O$) and potassium alum ($24H_2O$). Alternatively, the solute may be a sugar.

In one embodiment, the solution is a sodium chloride solution having a sodium chloride concentration of 2 to 39 weight %, preferably, 5 to 35 weight %, more preferably, 10 to 30 weight %. In another embodiment, the solution is a potassium chloride solution having a potassium chloride concentration of 5 to 50 weight %, preferably, 10 to 45 weight %, more preferably, 15 to 35 weight %. In another embodiment, the solution is a potassium nitrate solution having a potassium nitrate concentration of 5 to 80 weight %, preferably, 10 to 60 weight %, more preferably, 15 to 45 weight %. In yet another embodiment, the solution is a calcium chloride solution having a calcium chloride concentration of 5 to 120 weight %, preferably, 10 to 100 weight %, more preferably, 15 to 80 weight %. In an alternative embodiment, the solution is a sodium carbonate solution having a sodium carbonate concentration of 5 to 45 weight %, preferably, 10 to 35 weight i, more preferably, 15 to 30 weight %. In a further embodiment, the solution is a disodium hydrogenphosphate solution having a disodium hydrogenphosphate concentration of 5 to 39 weight %, preferably, 10 to 35 weight %, more preferably, 15 to 30 weight %. In another embodiment, the solution is a sodium sulphate solution having a salt concentration of 5 to 45 weight %, preferably, 10 to 40 weight %, more preferably, 15 to 39 weight %. In yet another embodiment, the solution is a magnesium sulphate solution having a magnesium sulphate concentration of 5 to 100 weight %, preferably, 10 to 80 weight %, more preferably, 15 to 75 weight %.

The difference in TDS of the liquid and the solution may be at least 1 weight %, for example, from 1 to 39 weight %, preferably, 5 to 35 weight %.

Any suitable selective membrane may be used in the process of the present invention. An array of membranes may be employed. Suitable membranes include cellulose acetate (CA) and polyamide (PA) membranes. The membrane may be planar or take the form of a tube or a hollow fibre. Thin membranes may be employed. If desired, the membrane may be supported on a supporting structure, such as a mesh support.

In one embodiment, one or more tubular membranes may be disposed within a housing. The liquid may be introduced into the housing, whilst the solution may be introduced into the tubular membranes. As the solvent concentration of the liquid is higher than that of the solution, liquid will diffuse across the membrane into the solution. Thus, the solution will become increasingly diluted with liquid. The diluted solution may be recovered from the interior of the tubular membranes, whilst the liquid may be removed from the housing.

When a planar membrane is employed, the sheet may be rolled such that it defines a spiral in cross-section.

The pore size of the membrane may be selected depending on the size of the solvent molecules that require separation. The membrane may have an average pore size of 1 to 60 Angstroms, preferably, 2 to 50 Angstroms, more preferably, 5 to 40 Angstroms, for example, 10 to 30 Angstroms. In one embodiment, the membrane has an average pore size of 12 to 25 Angstroms.

It may be possible to use a membrane having a pore size that allows two or more different types of solvent molecules to pass through the membrane. Conventional semi-permeable membranes may be employed. Typically, such semi-permeable membranes have an average pore size of, for example, 1 to 5 Angstroms.

The flow of solvent across a selective membrane is generally influenced by thermal conditions. Thus, the liquid and solution on respective sides of the membrane may be heated or cooled, if desired. Preferably, the solution is heated to a temperature of 30 to 90° C., preferably, 50 to 70° C. The liquid may be cooled, for example, to −20° C. to 20° C., for example, 7 to 12° C. Chemical reactions may also be carried out on either side of the membrane, if desired. In one embodiment, the solution and/or liquid may be agitated. In another embodiment, the solution and/or liquid may be subjected to an external field, such as an electrical, microwave and/or laser field, to enhance the osmotic potential difference between the two solutions.

The process of the present invention may further comprise a pre-treatment step of removing contaminants, such as suspended particles and biological matter, from the liquid (e.g. a waste stream, seawater, river water, lake water or brackish water). Additionally or alternatively, a threshold inhibitor to control scaling may be added to the liquid. Pre-treatment steps to alter the pH of the liquid may also be employed.

Optionally, the solution may also be treated to remove contaminants, such as suspended particles and biological matter. Additionally or alternatively, a threshold inhibitor to control scaling may be added to the solution. Pre-treatment steps to alter the pH of the solution may also be employed.

Optionally, step a) of the process may be repeated one or more times. Thus, the pressurised solution from step a) may be positioned on one side of a further selective membrane and a further solution may be placed on the other side of the membrane. The further solution has a higher osmotic potential than the solution on the other side of the membrane, such that the further solution becomes pressurised by the influx of liquid across the membrane. The pressure of the further solution may be used to drive the prime mover.

According to a further aspect of the present invention, there is provided an apparatus for driving a prime mover, said apparatus comprising a prime mover,
a housing comprising a selective membrane for separating a liquid from a solution having a higher solute concentration than the liquid and configured such that liquid passing through the membrane pressurises the solution,
means for transmitting the pressure generated in the solution to the prime mover,
means for recovering the solution,
means for separating solvent from the solution to produce a residual product, and
means for recycling the residual product and/or the separated solvent to the housing.

The residual product may be recycled to solution contained in the housing of the apparatus. Alternatively, the residual product may be recycled to solution contained in the housing of another apparatus according to the present invention.

The prime mover may be any suitable device which is suitable for converting energy in the solution into mechanical power. Suitable prime movers include rotary prime movers, such as turbines. Thus, the prime mover may be used to generate power.

Alternatively, the prime mover may be or form part of a pressure exchange system. Thus, the prime mover may also be used to transfer energy from the pressurised solution to another fluid. Examples of suitable pressure exchange systems are described in U.S. Pat. No. 4,887,942, U.S. Pat. No. 5,338,158, U.S. Pat. No. 5,988,993 and U.S. Pat. No. 6,540,487.

These and other aspects of the present invention will now be described with reference to the accompanying drawings, in which.

Figure 1:
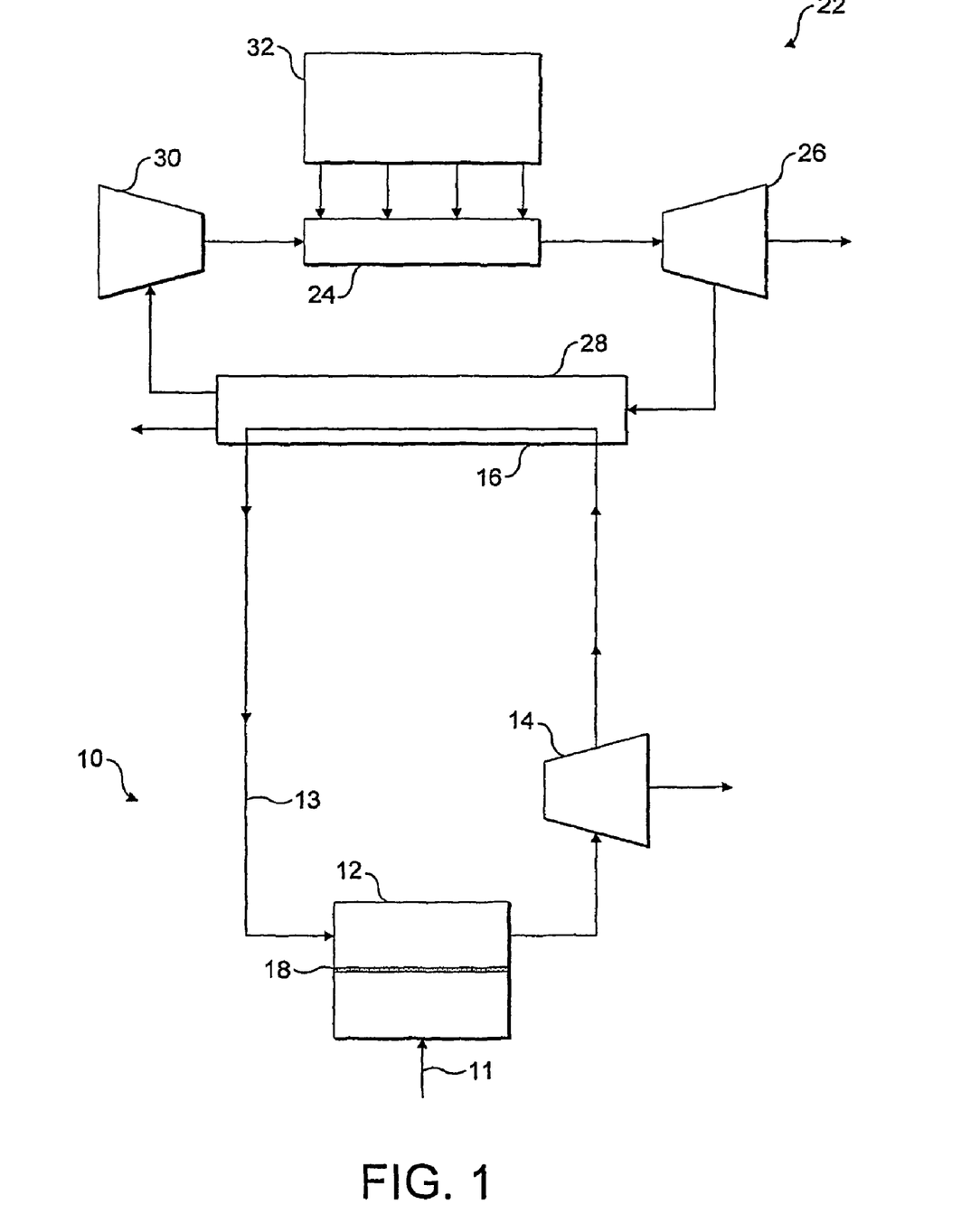
FIG. 1 is a schematic flow diagram of a process according to a first embodiment of the present invention.

Reference is first made to FIG. 1 of the drawings. This Figure depicts a process according to a first embodiment of the present invention. The process is performed using an apparatus 10 comprising an osmotic cell 12, a prime mover 14 (e.g. turbine coupled to an electrical generator) and a separator 16. The osmotic cell 12 comprises a semi-permeable membrane 18.

In use, water 11 (e.g. seawater) is introduced to one side of the membrane 18. A 30 weight % solution of sodium chloride 13 is introduced to the opposite side of the membrane 18. As the sodium chloride solution has a sodium chloride concentration that is higher than the total dissolved salt (TDS) concentration of seawater, water flows across the membrane 18 by osmosis. The influx of water across the membrane 18 increases the pressure of the sodium chloride solution.

Figure 1A:
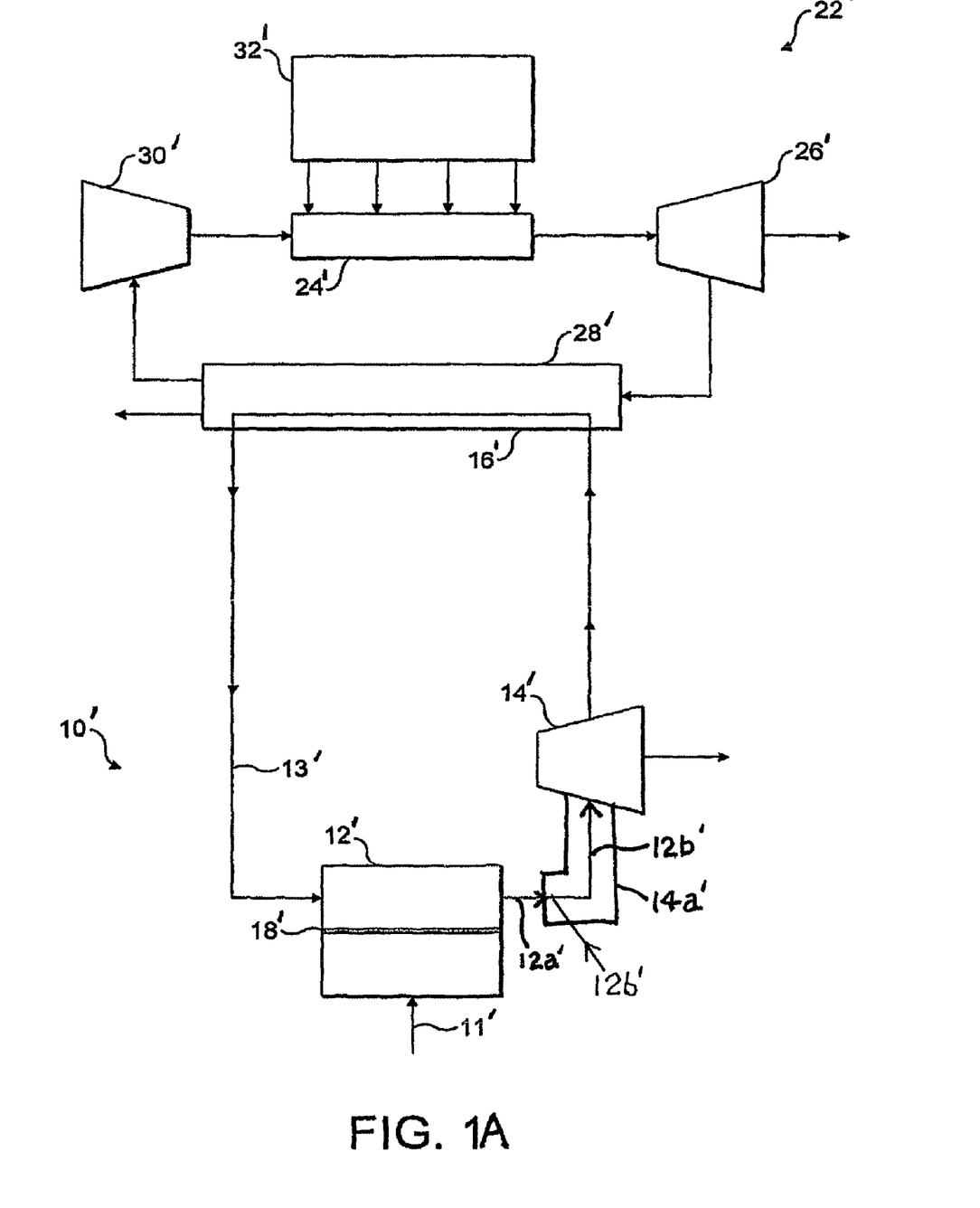
FIG. 1A is a schematic flow diagram showing an alternate embodiment of the present invention.

The pressurised sodium chloride solution is removed from the osmotic cell 12 and introduced to the prime mover 14. It is not necessary to pump the sodium chloride solution as the solution is pressurised by the osmosis step. The pressurised sodium chloride solution is used to drive the prime mover 14. The mechanical energy produced may be converted to other forms of energy, such as electrical energy. Referring to FIG. 1A, alternatively, the prime mover 14' may be or form part of a pressure exchange system 14a' used to transfer energy from the pressurized sodium chloride solution 12a' (from the osmotic cell 12') to a low pressure second liquid 12b' to drive the prime mover 14'.

The sodium chloride solution may then be removed from the prime mover 14 and introduced into the separator 16. In the separator 16, water is removed from the sodium chloride solution by evaporation. Once water is removed from the sodium chloride solution, the sodium chloride solution is recycled to the osmotic cell 12 for re-use. Thus, fresh sodium chloride solution is not required to replenish or replace the sodium chloride solution in the osmosis step.

The water removed by the evaporation step may be recovered and used, for example, as drinking water. Thus, this embodiment of the present invention may be used to desalinate seawater.

The apparatus 10 is located in close proximity to a conventional power station 22. The power station 22 comprises a boiler 24, a prime mover 26 (steam turbine) and a thermal unit 28 (condenser in power plant).

In use, water is introduced into the boiler 24 via a pump 30. The water is heated in the boiler 24 by the combustion of fuel 32 to produce superheated steam. The superheated steam is then introduced at high pressure to the prime mover (steam turbine) 26, and is used to drive the prime mover 26 to generate mechanical energy. The mechanical energy of the rotating prime mover 26 may be converted into other forms of energy, such as electrical energy.

Saturated or superheated steam is then recovered from the prime mover 26 and introduced into the thermal unit 28. In the thermal unit, the steam is condensed to water. The excess heat from the steam is used to evaporate water from the sodium chloride solution of apparatus 10. Thus, the sodium chloride solution from the prime mover 14 of apparatus 10 is used as a coolant in the thermal unit 28 of the power station 22. The separator 16 of apparatus 10, therefore, is effectively the same as the thermal unit 28 of the power station 22.

Once cooled, the condensed steam of the power plant is recycled to the boiler 24 via the pump 30.

Removed steam or water from the sodium chloride solution by the separator 16 can be used as a pure water product or recycled to unit 10.

Figure 2:
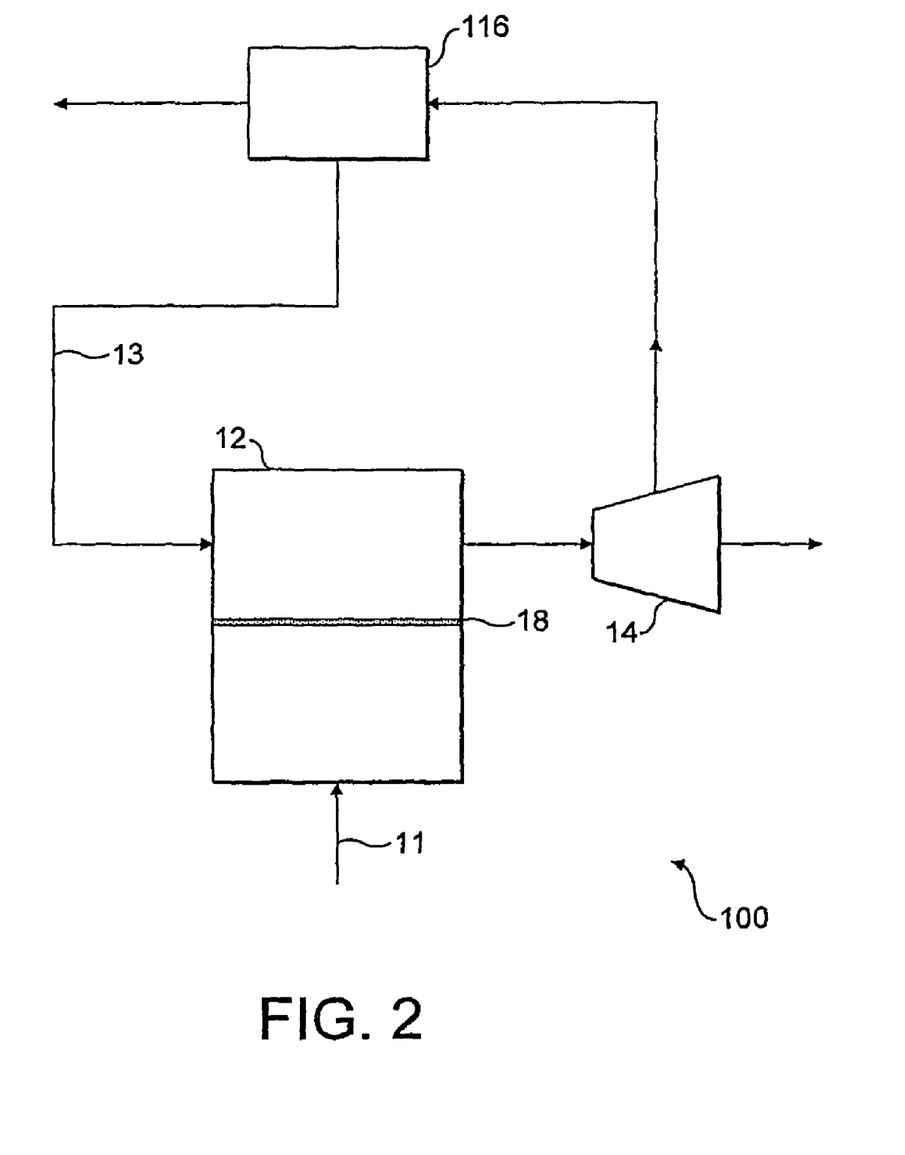
FIG. 2 is a schematic flow diagram of a process according to a second embodiment of the present invention.

Reference is now made to FIG. 2 of the drawings. This figure depicts a process according to a second embodiment of the present invention. The process is performed using an apparatus 100. Apparatus 100 is similar to the apparatus 10 of FIG. 1 and like components of the apparatus have been labelled with like numerals. Apparatus 100, however, is adapted for use in cold climates. Thus, unlike the apparatus 10 of FIG. 1, the apparatus 100 comprises a separator 116 that is a crystallizer. In use, solution emerging from the prime mover 14 is introduced into the separator 116 and cooled by the ambient temperature to produce ice and a concentrated sodium chloride solution. The former is removed and discarded, whilst the latter is recycled to the osmotic cell 12.

Figure 3:
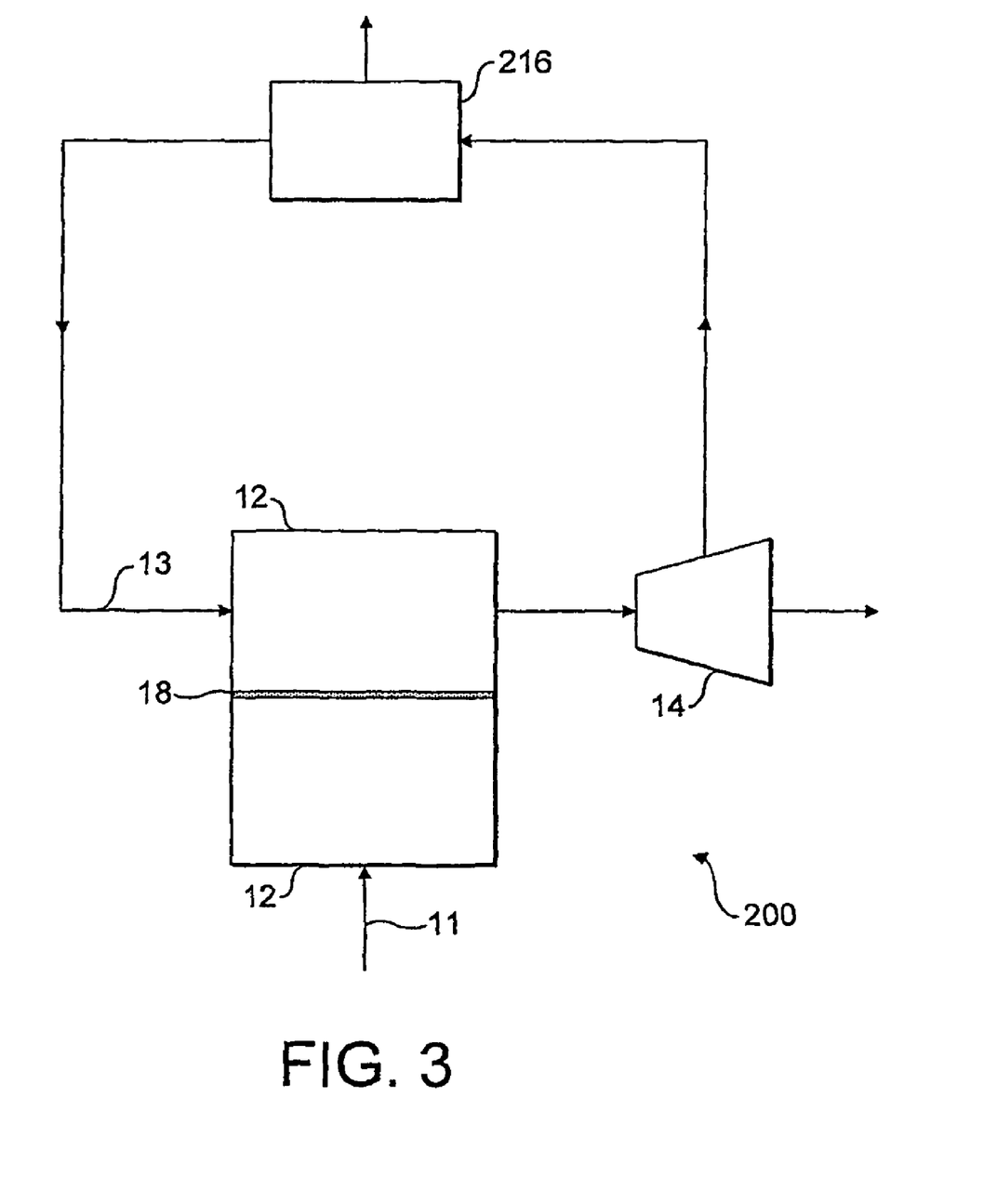
FIG. 3 is a schematic flow diagram of a process according to a third embodiment of the present invention.

Reference is now made to FIG. 3 of the drawings. This figure depicts a process according to a third embodiment of the present invention. The process is performed using an apparatus 200. Apparatus 200 is similar to the apparatus 10 of FIG. 1 and like components of the apparatus have been labelled with like numerals. Apparatus 200, however, is adapted for use in warm dry climates. Thus, unlike the apparatus 10 of FIG. 1, the apparatus 100 comprises a separator 216 that relies on natural or effective evaporation and/or solar energy to remove solvent from the solution emerging from the prime mover 14.

The invention claimed is:

1. A process for driving a prime mover, said process comprising:
   a) positioning a selective membrane between a liquid source selected from seawater or brackish water and an aqueous solution having a higher osmotic potential than the liquid source, such that the aqueous solution becomes pressurised by influx of water across the membrane from the liquid source to the aqueous solution,
   ai) providing a second liquid having a lower pressure than the aqueous solution,
   b) transferring pressure generated in the aqueous solution to said second liquid via a pressure exchange system to drive a prime mover,
   c) recovering the aqueous solution,
   d) separating at least some water from the aqueous solution to form a residual product, and
   e) recycling at least one of the separated water and the residual product of step d) to step a).

2. The process as claimed in claim 1, wherein the prime mover is a rotary prime mover.

3. The process as claimed in claim 1, wherein the aqueous solution is a solution of a salt selected from the group consisting of sodium chloride, potassium chloride, potassium nitrate, magnesium sulfate, magnesium chloride, sodium sulfate, calcium chloride, sodium carbonate, disodium hydrogen phosphate and potassium alum.

4. The process as claimed in claim 1, comprising forming the aqueous solution by dissolving ammonia and carbon dioxide in water.

5. The process as claimed in claim 4, wherein the aqueous solution comprises ammonia, carbon dioxide, ammonium carbonate, ammonium bicarbonate and ammonium carbamates.

6. The process as claimed in claim 1, wherein the aqueous solution has a solute concentration of 1 to 400 weight %.

7. The process as claimed in claim 1, wherein the liquid is or comprises water.

8. The process as claimed in claim 1, comprising removing the water in step d) by a thermal and/or membrane separation method.

9. The process as claimed in claim 8, wherein the water is removed by at least one method selected from ion-exchange, electrodialysis nanofiltration and osmosis.

10. The process as claimed in claim 1, wherein the water is removed using a method selected from evaporation, distillation and crystallization.

11. The process as claimed in claim 10, comprising removing the water by at least one method selected from multi-stage flash distillation, multi-effect distillation, mechanical vapour compression and rapid spray desalination.

12. The process as claimed in claim 1, wherein the energy required to remove the water in step d) is provided by wind power, thermal energy of surrounding environment, solar energy, geothermal energy, energy from a biological process, energy from combustion of fuel and/or excess heat from power plants and other industrial processes.

13. A process as claimed in claim 1, including recycling at least some of the water recovered in step d) to the liquid source for step a).

14. The process as claimed in claim 1, which comprises using the pressure generated in the aqueous solution to transfer the aqueous solution to an elevated location, and using the potential energy of the elevated aqueous solution to drive the prime mover.

15. The process as claimed in claim 1, including the step of transferring the aqueous solution from step a) to an elevated height where the ambient temperature is
   (i) low enough to crystallize at least some solute in the aqueous solution, or
   (ii) below the freezing point of the water to crystallize the water, such that the aqueous solution is separated into a portion having a low solute concentration and a portion having a high solute concentration.

16. The process as claimed in claim 15, including the step of returning each of said portions of the aqueous solution to ground level, such that potential energy of each of the portions can be used to drive the prime mover.

17. The process as claimed in claim 1, wherein thermal energy required to separate the water from the aqueous solution in step d) is provided by compression and decompression of gas.

18. The process as claimed in claim 1, wherein the selective membrane of step a) has an average pore size of 1 to 60 Angstroms.

19. The process as claimed in claim 1, further comprising, after step a), positioning the pressurised aqueous solution from step (a) on one side of a second selective membrane, and placing a second aqueous solution having a higher osmotic potential than the pressurised aqueous solution on another side of the second selective membrane, such that the second aqueous solution becomes pressurized by influx of liquid across the second selective membrane.

20. The process as claimed in claim 1, wherein the aqueous solution used in step a) is formed by dissolving a water-soluble salt in water and adding an anti-scaling agent to the aqueous solution.

21. The process as claimed in claim 3, wherein the aqueous solution used in step a) is formed by dissolving the selected salt in water and adding an anti-scaling agent to the aqueous solution.

* * * * *